(No Model.)
E. JULIEN.
SECONDARY ELECTRIC BATTERY.
No. 347,300. Patented Aug. 10, 1886.
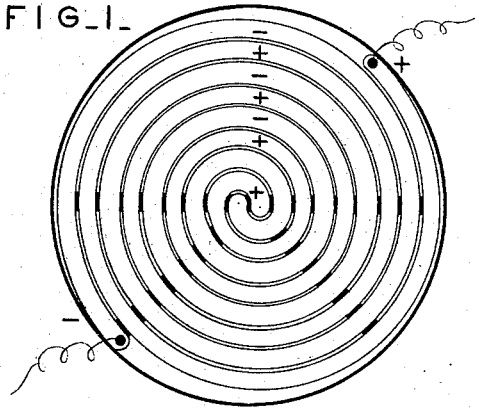
FIG. I.
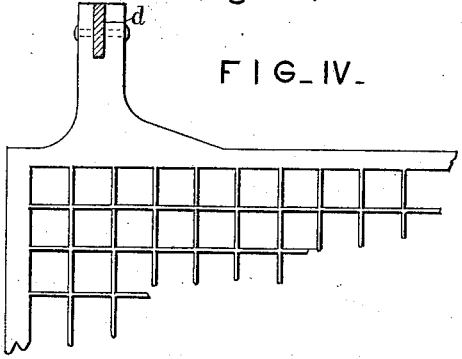
FIG. IV.
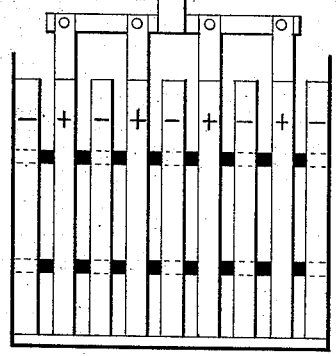
FIG. II.
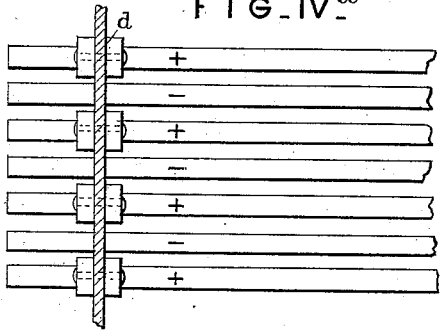
FIG. IVa.
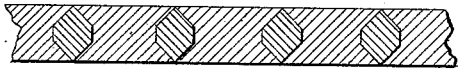
FIG. V.
FIG. VI.
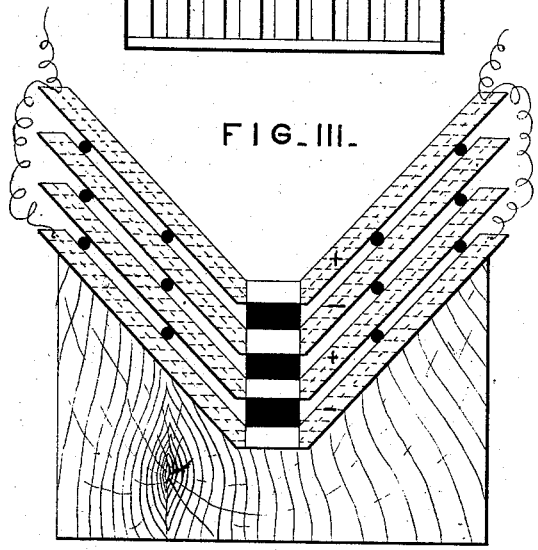
FIG. III.
FIG. VII.
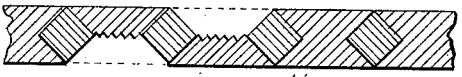
FIG. VIII.
Attest:
Geo. T. Smallwood
Edward Star
Inventor:
Edmond Julien
By Knight Bro
Attys

United States Patent Office.

EDMOND JULIEN, OF BRUSSELS, BELGIUM.

SECONDARY ELECTRIC BATTERY.

SPECIFICATION forming part of Letters Patent No. 347,300, dated August 10, 1886.

Application filed January 11, 1886. Serial No. 188,238. (No model.) Patented in France July 20, 1885, No. 170,215; in England July 23, 1885, No. 8,881, and in Italy September 30, 1885, No. 18,718.

*To all whom it may concern:*

Be it known that I, EDMOND JULIEN, engineer, residing at Brussels, in the Kingdom of Belgium, have invented a new and useful Improvement in Secondary Electric Batteries, (for which no patent has been obtained in any other country, except in France July 20, 1885, No. 170,215; in Italy September 30, 1885, No. 18,718, and in England July 23, 1885, No. 8,881,) of which the following is a specification.

Hitherto there have been employed in the construction of plates or supports for the active matters of electric accumulators or secondary batteries lead, chemically pure, or approaching as nearly as possible this condition. Experience has shown that pure lead does not resist the destructive oxidizing action which is produced during the chemical operation of charging and discharging. The support-plates, which are first deformed by expanding, deteriorate in a short time. Finally they become completely peroxidized and are inert and inactive. The force and duration are insufficient. It is owing to these causes that the industrial applications of secondary batteries—like the Faure, for example—have been so very limited up to the present time, notwithstanding the importance which is attached to their use; and in many cases these batteries have been condemned.

The present invention has for object to completely remedy the state of things which I have just briefly indicated, and at the same time to create a practical and durable accumulator of electricity.

In the accompanying drawings have been illustrated various forms of support-plates and connections of secondary batteries, which may serve to illustrate my invention. This invention is not, however, limited to any of these forms, but is of a general nature, appertaining to the material of the parts of the battery rather than to their structure or form.

In said drawings, Figures I, II, and III show in plan or vertical section three modes in which my improved support-plates may be arranged. Fig. IV is a sectional elevation of a portion of a support-plate. Fig. IV<sup>a</sup> is a plan of a number of such plates, showing the method of connection of those of like sign. Figs. V, VI, and VII are transverse sectional views of various forms of grated support-plates, adapted to insure the more firm retention of the active matters. Fig. VIII is a similar view of the form of plate commonly employed, showing the method of distribution of the active matters when the bars of the grate or support-plate swell.

My accumulator is composed, principally, of: (*a*) support-plates for the active matters; (*b*) active matters; (*c*) conductor-liquid; (*d*) connections.

I will first describe each of these parts.

(*a*.) *Support-plates.*—This first part is of the greatest importance. To manufacture my plates I form a new metal by an alloy of lead, antimony, and mercury, and I obtain thus a product which is inoxidizable—that is to say, which resists entirely the destructive oxidizing action when the proportions of this alloy are suitably established. A suitable proportion, as shown by experience, and which gives the best results, is as follows: pure lead, ninety-six parts, in weight; antimony, three parts, in weight; mercury, one part, in weight. I reserve, however, the right to vary this proportion in certain limits, according to the work to which the accumulator is destined. My support-plates are solid or perforated, in the form of cells or a grate. They are arranged either in spiral, parallel, or superposed in conical form. They are separated one from another by cut-offs—such, for example, as buttons of rubber or similar material, Figs. I, II, III. These forms of plates will be readily understood by those having knowledge of the art, and, forming no part of my invention, are not herein particularly described.

(*b*.) *Active matters.*—The active matter is formed by a mixture of different lead salts, such as minium and litharge. To this mixture I add a certain quantity (five to ten per cent.) of mercury. These matters are applied to the support-plates by a chemical or mechanical process.

(*c*.) *Conductor-liquid.*—The liquid generally employed is water acidulated by sulphuric acid; but to avoid the effects of polarization when an energetic action of the battery is required I add to this liquid a variable quantity of bioxide of hydrogen.

(d.) *Connections.*—The electrodes are united to each pole by a conductor of same metal as that used for the plates.

The accumulator thus prepared is plunged into a receptacle containing the liquid.

The mode of formation and the chemical action which take place in the accumulator are sufficiently well known; but to better demonstrate the importance of my invention I will say that the active matter of the said positive plate is transformed into peroxide of lead, ($PbO_2$,) while that of the negative plate is reduced to lead, (Pb.) It is understood that after a certain time the pure lead which formed the frame-work of the positive plates was itself attacked by the oxygen and became peroxidized at the same time as its active matter, and that this lead soon ceased to be a conductor. It became inert and lost all consistency.

The first part of my invention has for its object to do away with this great inconvenience which has been the principal cause of failure, because the nature of the metal which I use renders the support-conductor rigid and inoxidizable. It follows that my accumulators have a "frame-work," so to speak, unchangeable, and by the whole of my method they become really reservoirs of electric energy suitable to industrial uses, which had notably not been the case prior to my discovery.

I will indicate here briefly the other advantages which my system presents compared with all those before known. The duration of the plates, and consequently the duration of the elements, is very long, if not unlimited. The plate-supports are no longer subject to expansion or deformation, and they retain completely the active matter applied, which formerly became detached. The active matter, owing as well to the manner of its composition as to the metallic nature of the support, adheres completely to the latter and forms no sulphate on their contact-surface. The plates may be very thin, which permits a noticeable reduction in the weight of the accumulators for a given work. This perfect adherence of the active matter to the support permits also a greater section to the cells which contain it, from which result an increase in the weight of active matter and a diminution in the weight of the plate for the same volume. As a consequence of these facts, the storing capacity is considerably increased; the action is more regular and always assured; the force is considerably higher; the interior resistance is less; in fact, the electro-motive force is greater. These numerous advantages mark well the difference which is shown to exist between accumulators made according to my method and those made according to other systems. They show by the results obtained that my accumulator produces a new secondary battery much superior to all others.

The method of connection which I have indicated (lettered d) has the advantage of avoiding the formation of sulphates, which were produced on the copper connections, and of doing away with soldering, while assuring a perfect contact. To accomplish this result I make a groove in the borders of the electrodes and I introduce there a band of my metal. This band is strongly compressed in the grooves by means of a pair of grippers, and I secure the contact by a lead rivet, as seen in Fig. IV. I also make the connecting-wires of the same metal. When I use perforated plate-supports, I give to the conductors forming the frame-work one of the arrangements indicated in Figs. V, VI, and VII, which avoids the use of sharp corners entering into the lead composition contained in the cells, and which detach this matter when the latter swells, as shown in Fig. VIII.

These explanations show that it is not in the principle of the accumulator that the cause of failure which has attended the use of electric secondary batteries is to be found, but principally in the nature of the metal employed for the manufacture of the plates. In this respect my invention constitutes an important improvement and is of great industrial value.

Although the liquid bioxide of hydrogen of which I have spoken above is specially intended for the secondary battery which forms the principal object of the present invention, this application may extend generally to all primary or secondary batteries. The production of bioxide of hydrogen rendering the liquid depolarizing, is capable of obtaining by an acid a salt or a base having the property of losing easily its oxygen, either by electrolyte or chemical reaction.

I am aware that an electrode for secondary batteries has been made, in which an amalgam of lead and mercury is employed, to which is added any suitable metal to lower the fusing-point; then during fusion active matters are added and inert matters, making of the whole a plastic mass. In this case, when the electrode is molded and cooled, a solid plate is formed whose constituents, in a thoroughly-intermingled state, are lead, mercury, antimony, (perhaps,) lead oxide, and carbon. This plate is attacked and is rendered porous when the battery is in operation. In my invention, on the contrary, the plate remains and is intended to remain perfectly unaltered. The plate is made of lead, mercury, and antimony in about the proportions stated, and after it has been formed active matters are applied to it in any desired manner.

Having thus described my invention, what I claim is—

1. In an accumulator, the combination of support-plates formed of an alloy of lead, antimony, and mercury, an active matter consisting of a metallic salt applied to said plate after the latter is formed, and a suitable conducting-liquid, substantially as and for the purpose set forth.

2. In an accumulator, the combination of support-plates formed of an alloy of lead, antimony, and mercury, an active matter consisting of a metallic salt, and a conducting-liquid containing bioxide of hydrogen, substantially as and for the purpose set forth.

3. An electrode for secondary batteries, consisting of a support-plate formed of an alloy of lead, antimony, and mercury, and an active matter applied to the support-plate after the latter is formed, substantially as and for the purpose set forth.

4. In combination with the support-plates of an accumulator, an active matter supported thereby, and a conducting-liquid, a conductor connected to such plates and composed of an alloy of lead, antimony, and mercury, substantially as and for the purpose set forth.

In testimony whereof I have signed this specification in the presence of two subscribing witnesses.

EDMOND JULIEN.

Witnesses:
EMILE PICARD,
GUILLAUME HEIDEL.